United States Patent
Rawdon

(10) Patent No.: US 9,889,925 B2
(45) Date of Patent: Feb. 13, 2018

(54) SINGLE BLADE PROPELLER WITH VARIABLE PITCH

(71) Applicant: The Boeing Company, Chicago, IL (US)

(72) Inventor: Blaine K. Rawdon, San Pedro, CA (US)

(73) Assignee: The Boeing Company, Chicago, IL (US)

(*) Notice: Subject to any disclaimer, the term of this patent is extended or adjusted under 35 U.S.C. 154(b) by 629 days.

(21) Appl. No.: 14/493,274

(22) Filed: Sep. 22, 2014

(65) Prior Publication Data

US 2016/0083077 A1    Mar. 24, 2016

(51) Int. Cl.
*B64C 27/54* (2006.01)
*B64C 11/44* (2006.01)
*B64C 11/00* (2006.01)
*B64C 11/06* (2006.01)

(52) U.S. Cl.
CPC .............. *B64C 11/44* (2013.01); *B64C 11/00* (2013.01); *B64C 11/06* (2013.01)

(58) Field of Classification Search
CPC ....... B64C 11/008; B64C 11/06; B64C 11/44; B64C 27/008; B64C 27/06
USPC ........................................................ 416/19
See application file for complete search history.

(56) References Cited

U.S. PATENT DOCUMENTS

| | | | | |
|---|---|---|---|---|
| 1,972,485 A | * | 9/1934 | Hoover | B64C 11/06 416/157 R |
| 2,124,369 A | * | 7/1938 | Everts | B64C 11/343 244/65 |
| 2,742,095 A | | 4/1956 | Pitcairn et al. | |
| 5,971,322 A | | 10/1999 | Beretta et al. | |
| 6,196,801 B1 | * | 3/2001 | Muhlbauer | B61C 11/06 416/157 R |
| 6,234,422 B1 | | 5/2001 | Bolonkin | |
| 6,619,585 B1 | | 9/2003 | Lidak | |
| 6,767,187 B2 | * | 7/2004 | Franchet | B64C 11/305 416/157 R |

FOREIGN PATENT DOCUMENTS

GB    124935 A  *  4/1919  ........... B64C 11/346

OTHER PUBLICATIONS http://www.rexresearch.com/unibladeprop/onebladeprop.htm.

* cited by examiner

*Primary Examiner* — Craig Kim
*Assistant Examiner* — Jason Fountain
(74) *Attorney, Agent, or Firm* — Felix L. Fischer

(57) ABSTRACT

An improved performance propeller employs a single propeller blade having an axis of rotation and a centripetal force about the axis. A pitch control unit is mounted opposite the single propeller blade and has a compensating centripetal force with respect to the single propeller blade about the axis.

25 Claims, 14 Drawing Sheets

SINGLE BLADE PROPELLER WITH VARIABLE PITCH

BACKGROUND INFORMATION

Field

Embodiments of the disclosure relate generally to the field of propulsion systems for aircraft and more particularly to a single blade propeller with variable pitch employing an electrically powered pitch control mechanism as a counterweight.

Background

Solar powered airplanes are typically powered by electrical motors receiving power from a solar array on the surface of the aircraft and driving multiple bladed propellers. In most cases these airplanes are designed for very high altitude flight with long duration flight profiles. Performance of such solar powered airplanes is very sensitive to component efficiency. Propeller efficiency is approximately equivalent in importance to airframe lift to drag (L/D). In example prior art systems a 2.0% absolute efficiency improvement in propeller efficiency may offset an airplane weight increase of 1.3% or increase winter solstice maximum latitude by approximately 1°.

Additionally, such solar powered airplanes have little reserve power for climb, even at low altitude. In dense low altitude air at slow flight speeds, the motor bogs down at low propeller rotational speed (RPM). Even though the airplane requires far less power to fly, the motor is current-limited by overheating concerns and produces little excess power.

It is therefore desirable to provide a means to increase motor RPM to increase motor power without exceeding the current limit.

SUMMARY

Exemplary embodiments provide an improved performance propeller employing a single propeller blade having an axis of rotation and a centripetal force about the axis. A pitch control unit is mounted opposite the single propeller blade and has a compensating centripetal force with respect to the single propeller blade about the axis.

The embodiments disclosed provide a method wherein a single blade propeller is counter balanced for higher efficiency in thrust production over conventional multibladed propellers by selecting a single propeller blade with radius and chord profile to provide a higher efficiency than a baseline multibladed propeller. The propeller blade is mounted with a hub shaft supported by bearings to a propeller shaft extending from a motor and secured with lock rings. A pitch control unit is attached to the propeller shaft with a support bracket and to the hub shaft extending oppositely from the single propeller blade. The center of gravity of the pitch control unit is spaced relative to an axis of rotation of the propeller to provide a balancing force for the propeller blade.

BRIEF DESCRIPTION OF THE DRAWINGS

The features and advantages of embodiments disclosed herein will be better understood by reference to the following detailed description when considered in connection with the accompanying drawings wherein.

DETAILED DESCRIPTION

Figure 1:
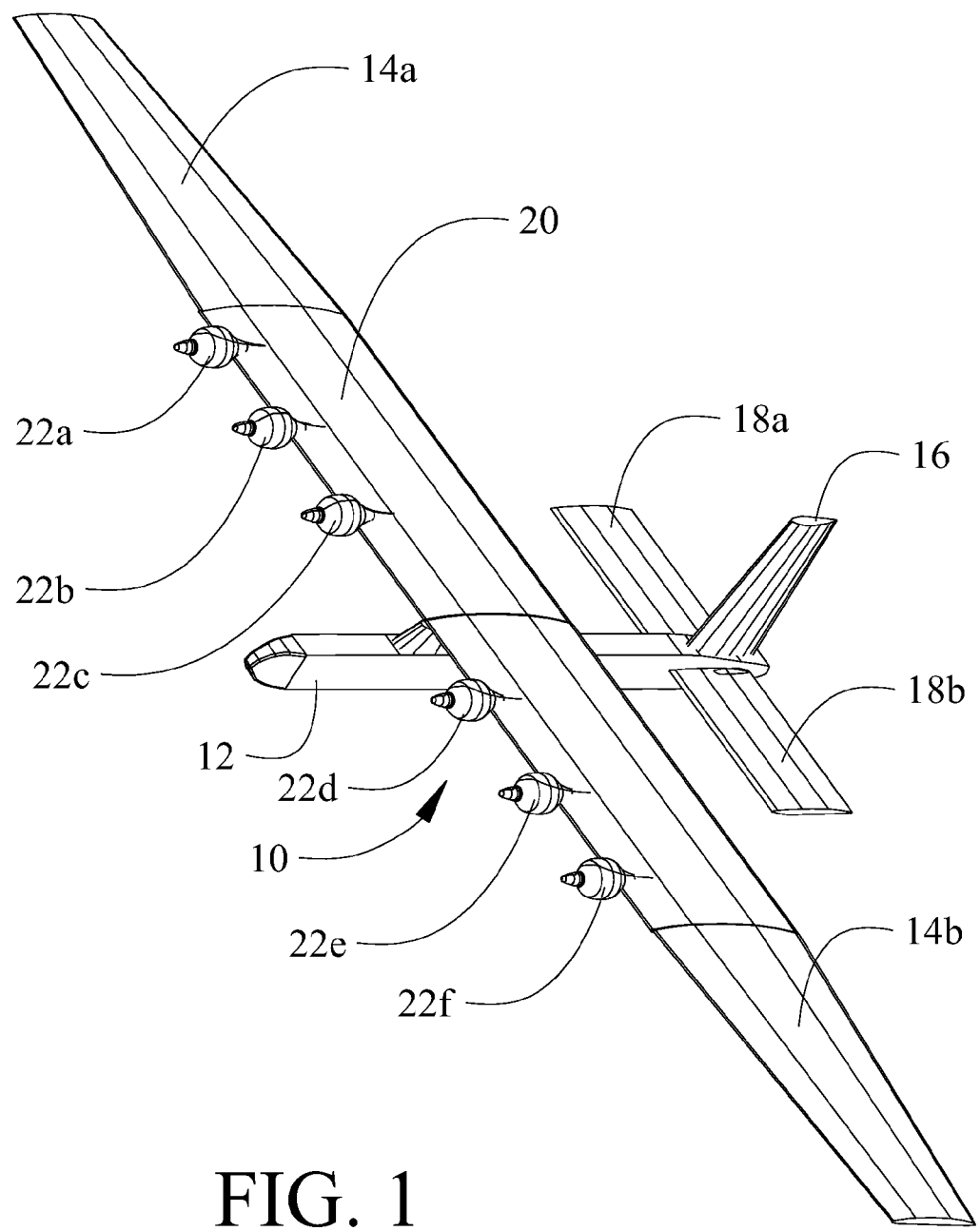
FIG. 1 is perspective view of an exemplary airplane in which the present embodiments may be employed.

An exemplary embodiment disclosed herein provides a variable pitch, single-blade propeller balanced by a pitch control mechanism providing improved performance over a baseline multibladed propeller. An alternative embodiment includes blade teeter. While disclosed herein with respect to a solar powered airplane for high altitude flight, the embodiment is applicable to alternative airplane types and missions.

Employing a variable pitch propeller allows the single blade to be varied in pitch angle to permit higher motor RPM at low airplane true airspeed, increasing motor power and airplane climb rate. Improved low altitude climb rate may permit the propeller and motor design to be optimized for the high altitude condition, improving performance in the dominant flight condition.

However, the variable pitch mechanism additionally serves as counterweight for the blade since propellers must be balanced about the propeller axis and single-blade propellers are inherently imbalanced and require the addition of a counterweight. Use of the variable pitch mechanism provides needed blade counterweight reducing or eliminating the need for "dead" counterweight material. The variable pitch mechanism may be electrically powered and controlled. Electrical power and control is already available on a high altitude, low power airplane such as a solar powered airplane. In alternative embodiments, the blade pitch mechanism may be electrically powered but signaled by radio for pitch angle control. It is desirable that the variable pitch mechanism may fail without a change in blade pitch. The mechanism for the embodiments disclosed may be designed with a brake or with irreversible gears (such as a worm gear) so that a loss of power to the mechanism does not result in a change in propeller blade pitch. Once the airplane is at its design altitude and speed, changes in propeller pitch may not be needed and a failure of the mechanism may not influence flight performance or endurance.

It may not be optimal to have the propeller axis perpendicular to the propeller shaft axis. Furthermore, it may not be optimal to provide a dynamically balanced system. The blade cone angle and the propeller/pitch actuation system center of gravity may be determined to diminish net forces resulting from blade thrust and torque reaction offset from the propeller axis. Additionally, blade teeter maybe employed as a means to eliminate moments resulting from the single blade's offset thrust line (with respect to the propeller shaft axis). Blade teeter may also improve the propeller disk loading uniformity as well as blade lift coefficient uniformity as it sweeps the propeller disk.

The single propeller blade may be characterized by a larger chord than a multi-blade design. This increases the Reynolds number on the blade and improves blade element L/D, which may improve propeller performance. In addition, the blade may optimally sweep a larger diameter than an equivalent multi-blade propeller to reduce propeller induced losses. A single blade propeller employed on multiple wing mounted electric motors sheds approximately one-half as many wakes across the wing thereby reducing losses associated with the wake. The single blade is additionally likely to optimize at a higher segment lift coefficient than an equivalent multi-blade prop, which may provide better off-design performance. The single blade may be retained in a propeller hub with an external fitting that may be lightweight, reliable and easily inspected and repaired.

Referring to the drawings, an exemplary solar powered aircraft concept on which the present embodiments may be employed is shown in FIG. 1. The aircraft 10 incorporates a fuselage 12 with wings 14a and 14b. An empennage employs a vertical stabilizer and rudder 16 and horizontal stabilizers with elevators 18a, 18b. While shown as a conventional aircraft layout, alternatives may employ flying wing or canard designs. A solar array 20 arranged over the upper surfaces of the wings and other surfaces of the aircraft provides electrical power. Multiple motor pods 22a-22f support electric motors driving propellers (not shown).

Figure 2:
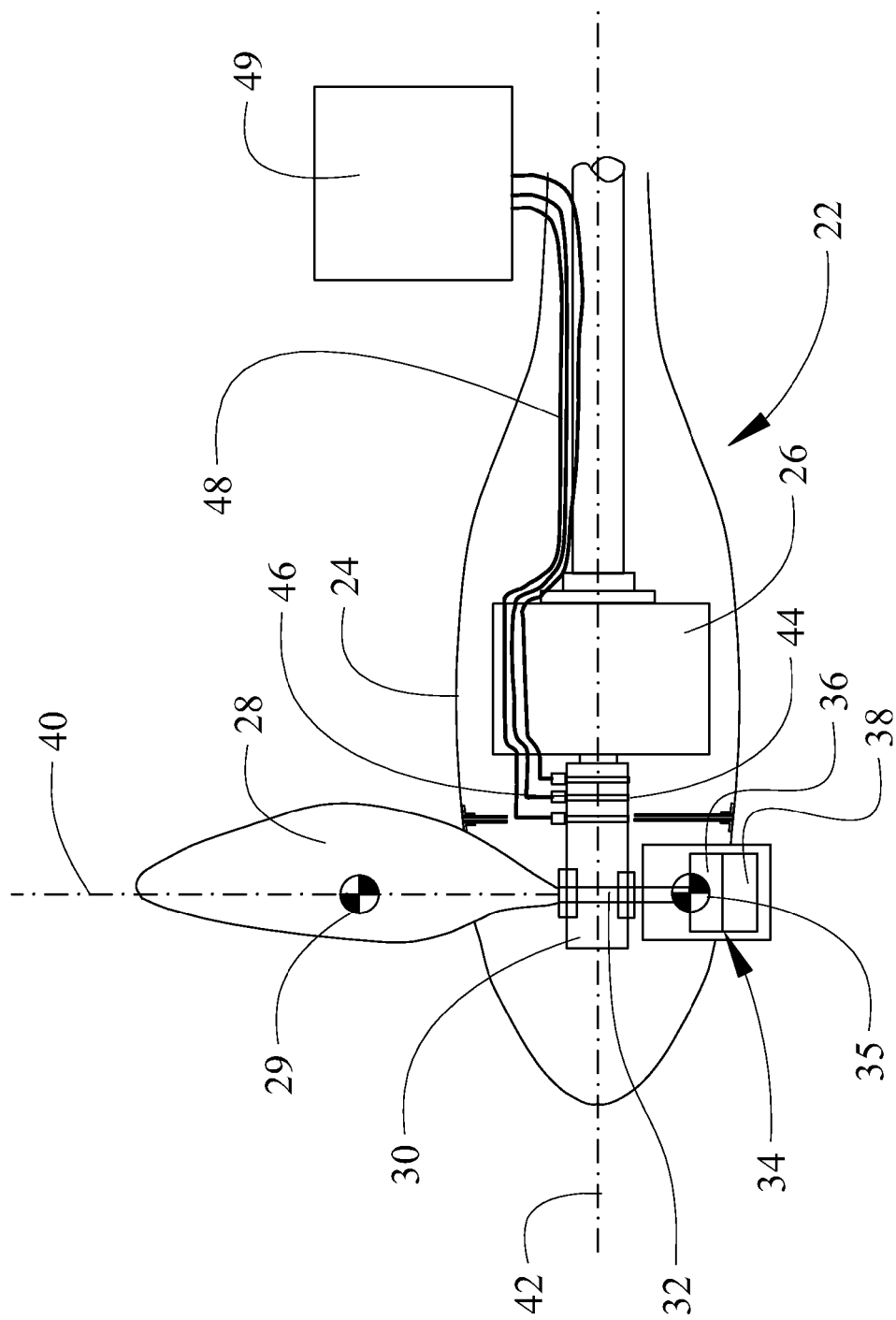
FIG. 2 is a section view showing the components of the embodiment.

FIG. 2 shows an exemplary motor pod 22 employing the present embodiment. A fairing or nacelle 24 encloses the motor 26 and provides mounting structure for attachment to the aircraft wing or other supporting structure. A propeller blade 28 is mounted to a drive shaft 30 extending from the motor 26 with a hub tube 32 extending through the shaft. A gear box may be employed between the motor 26 and drive shaft 30 to achieve desired RPM. A pitch control unit 34 attaches to the hub tube 32 on the opposite side of the shaft 30 from the propeller blade 28. The mass of the pitch control unit and its center of gravity 35 are positioned to provide a balancing force for the propeller blade 28 and its center of gravity 29 about an axis of rotation, which for the embodiment shown is a propeller drive shaft axis 42. The pitch control unit 34 incorporates a gearbox 36 and a pitch control motor 38 attached to and driving the gearbox. Operation of the gearbox 36 rotates the hub tube 32 which rotates the propeller blade 28 about blade axis 40 extending approximately radially outward from a center of the propeller, approximately in the plane of rotation of the propeller and is substantially perpendicular to the propeller drive shaft axis 42. The propeller drive shaft axis 42 also constitutes the axis of rotation of the propeller. Rotation of the propeller blade 28 about the blade axis 40 constitutes variable pitch.

For descriptive purposes herein, blade pitch is said to increase when the blade leading edge is rotated forward (where forward is the general direction of flight). Decreased blade pitch is the opposite. Shaft power provided by the motor 26 is the product of torque and RPM. Electric motor torque is approximately proportional to motor current. Motor current may be limited by cooling capacity. This means that motor torque is limited so maximum motor power is proportional to RPM. Propeller thrust is the product of shaft power times propeller efficiency divided by true airspeed. An increase in blade pitch tends to increase the lift coefficient of each blade section. If RPM is held constant this results in increased shaft torque and a greater power requirement from motor and increased thrust. If power remains constant, the result will be reduced RPM. If torque remains constant, RPM will be reduced and power will drop. When propeller pitch and RPM are held constant, an increase in airspeed tends to reduce blade section lift coefficient, thereby reducing shaft torque and thrust. Conversely, a decrease in airspeed tends to increase blade section lift coefficient, increasing torque and thrust. If constant torque is applied with variations in airspeed, the propeller RPM will vary approximately as true airspeed and shaft power declines approximately in proportion to true airspeed. Propeller efficiency varies with advance ratio which may be defined as propeller tip circumferential speed divided by true forward airspeed. Tip circumferential speed is proportional to RPM. For each propeller design, there is a single advance ratio that provides maximum efficiency. A long-endurance airplane may optimize its propeller design to provide needed thrust at this most-efficient advance ratio.

Figure 3A:
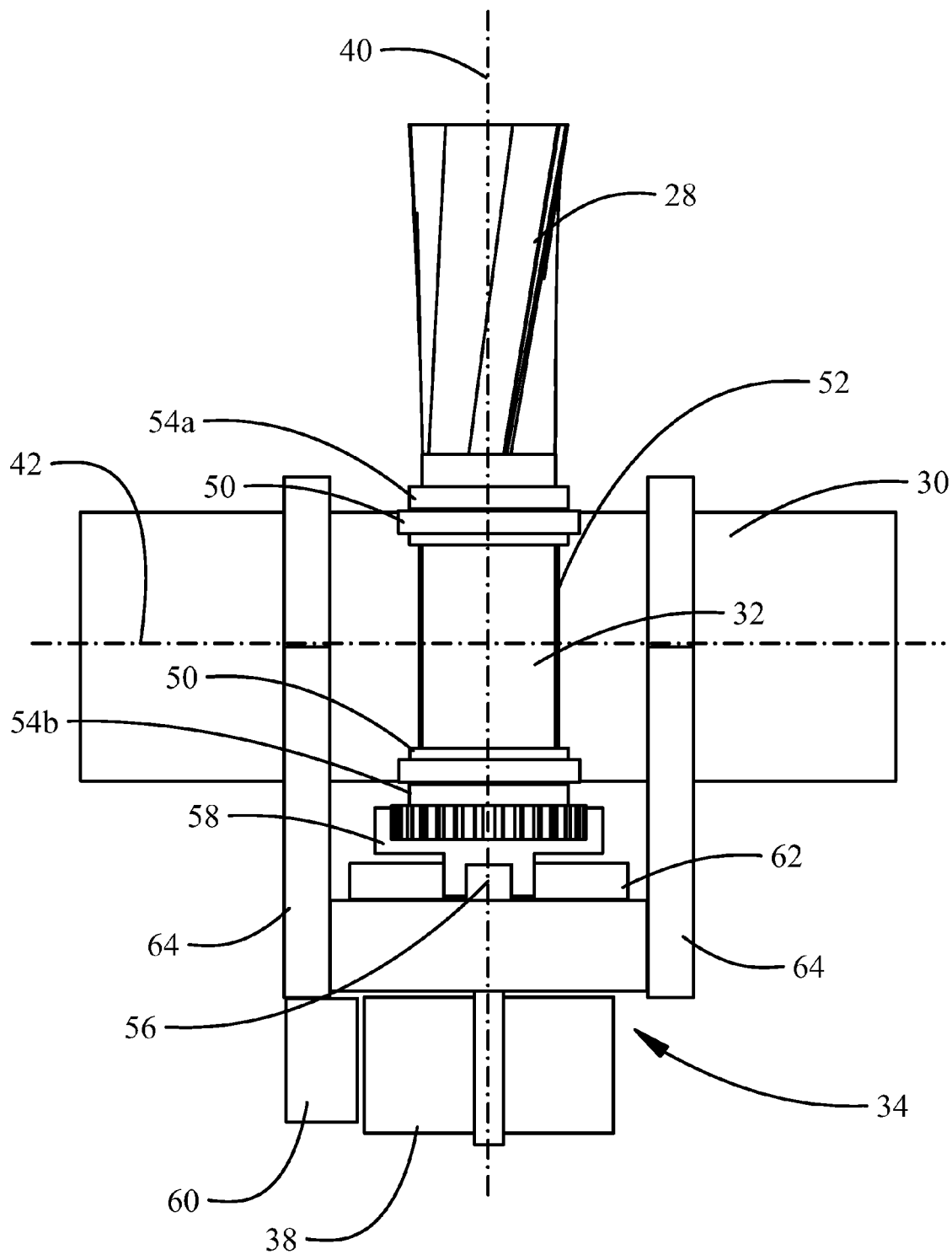
FIG. 3A is a side detailed section view of the pitch control unit and propeller blade hub.
Figure 3B:
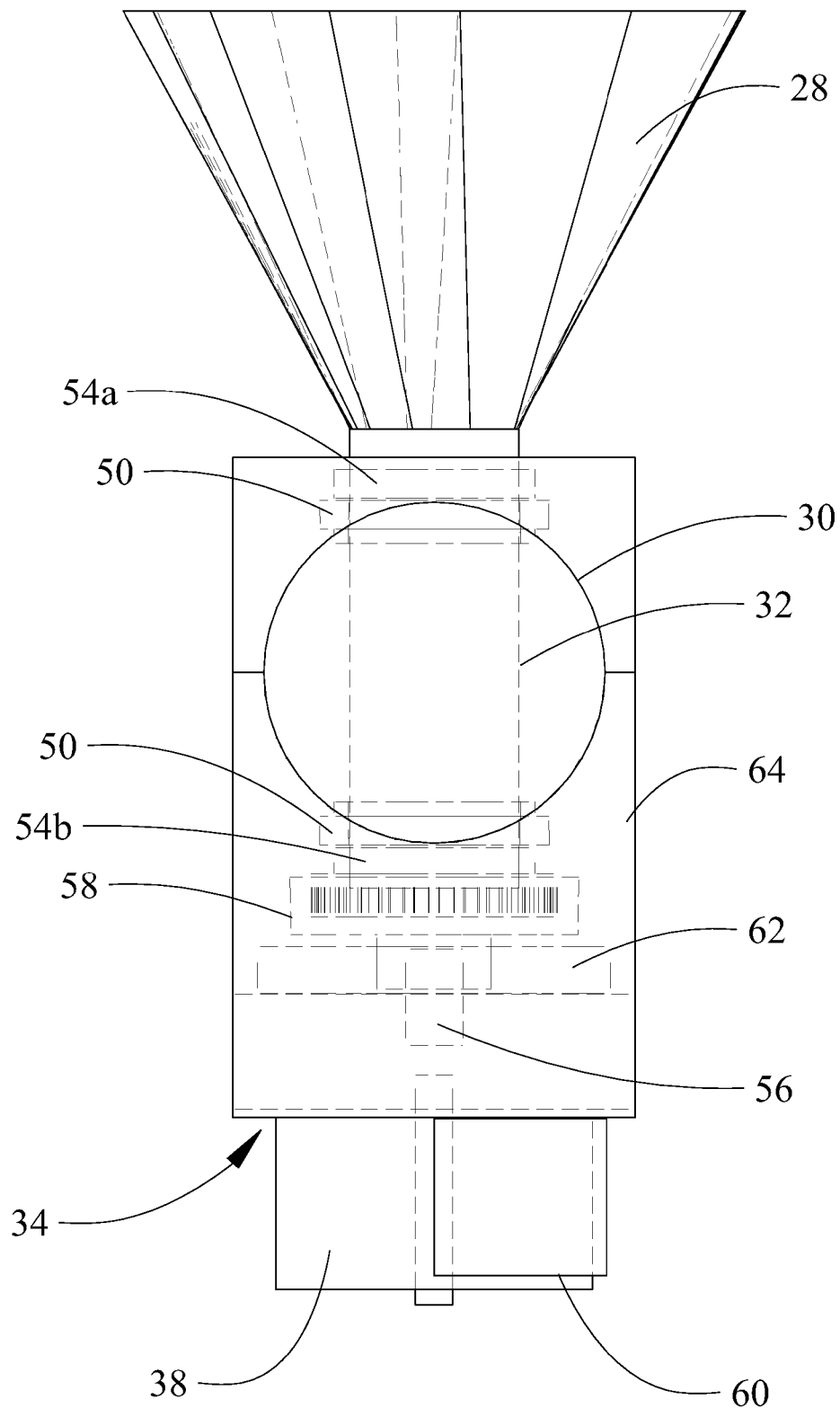
FIG. 3B is a front detailed section view of the pitch control unit and propeller blade hub.

For the embodiment shown in FIG. 2, electrical power and the control signal for the pitch control motor 38 are provided with slip rings 44 and brushes 46 electrically interconnecting power and signal conductors 48 across the rotating shaft 30 from the airplane power and control system, generally represented as block 49. For the embodiment shown, three wires are employed, positive and negative for power and a third wire with an encoded signal. The encoded signal provides instructions to define a target pitch position for the pitch control mechanism which moves under power to that target and then holds that position Details of the pitch control unit and propeller blade mounting are seen in FIGS. 3A and 3B (individual electrical wire connections are not shown for clarity). The propeller drive shaft incorporates one or more bearings 50 the axes of which are perpendicular to the propeller shaft and co-linear. For the embodiment shown a pair of bearings 50 are employed diametrically opposed across the propeller shaft axis 42. The bearings 50 receive the propeller blade hub tube 32 and permit the hub tube and attached propeller blade 28 to rotate about its axis 40 (change pitch as previously described). The bearings 50 transfer blade loads into the propeller shaft. Optionally the hub tube 32 may be conical, or stepped but in any case is circular in a cross section taken perpendicular to the axis 40 where the hub tube fits into the bearings 50 and through a bearing bore 52. The hub tube 32 is approximately aligned with the radial axis 40 of the propeller blade 28. The hub tube has features that enable two functions; retention of the propeller blade 28 along its axis in the outward direction and connection to the blade pitch control unit 34. Lock rings 54a and 54b or a similar retention device limits how far the hub tube goes into the propeller shaft bearings on both sides of the drive shaft and secures the hub shaft and blade to the propeller shaft 30.

The blade pitch control unit 34 controls blade pitch angle in response to signals originating elsewhere (e.g. the airplane's flight control computer). A rotary actuator output shaft 56 extending from the gearbox 36 attaches to the propeller blade hub tube 32. For the embodiment shown in the drawings, a coupler 58 engages the lock ring 54b. The actuator output shaft is fixedly mounted to the propeller through the hub tube to resist torsional forces about the propeller radial axis 40 transmitted by the propeller blade.

For the embodiment shown in the drawings, the pitch control unit 34 is an electro-mechanical device employing the electric pitch control motor 38 which may be favorably a stepper motor, however, other motor types are feasible. A motor controller 60 may be used to operate the pitch control motor 38 in response to supplied control signals when supplied with power. The gearbox 36 may favorably provide an extreme gear reduction from the motor to the rotary actuator output shaft 56 and hub tube coupler 58. This reduces required motor torque and increases blade pitch control accuracy. A position sensor 62 may be included in association with the gearbox to provide a pitch angle output for feedback to a flight control computer regarding the propeller's pitch angle. Alternatively the flight control computer may deduce the propeller pitch angle from motor current, motor RPM, airspeed, altitude and other available data.

The pitch control unit 34 acts as a counter-weight for the one-bladed propeller. The actuating elements of the pitch control unit 34, the gearbox 36 and pitch control motor 38, are mounted to the propeller shaft 30 on the opposite side from the single propeller blade 28 with a support frame 64. The characteristics of the actuating elements are designed to balance the propeller blade. The weight, distance of the center of gravity from the propeller shaft axis 42 and distance of the center of gravity from the propeller radial axis 40 may be adjusted to provide the desired balance.

Figure 3C:
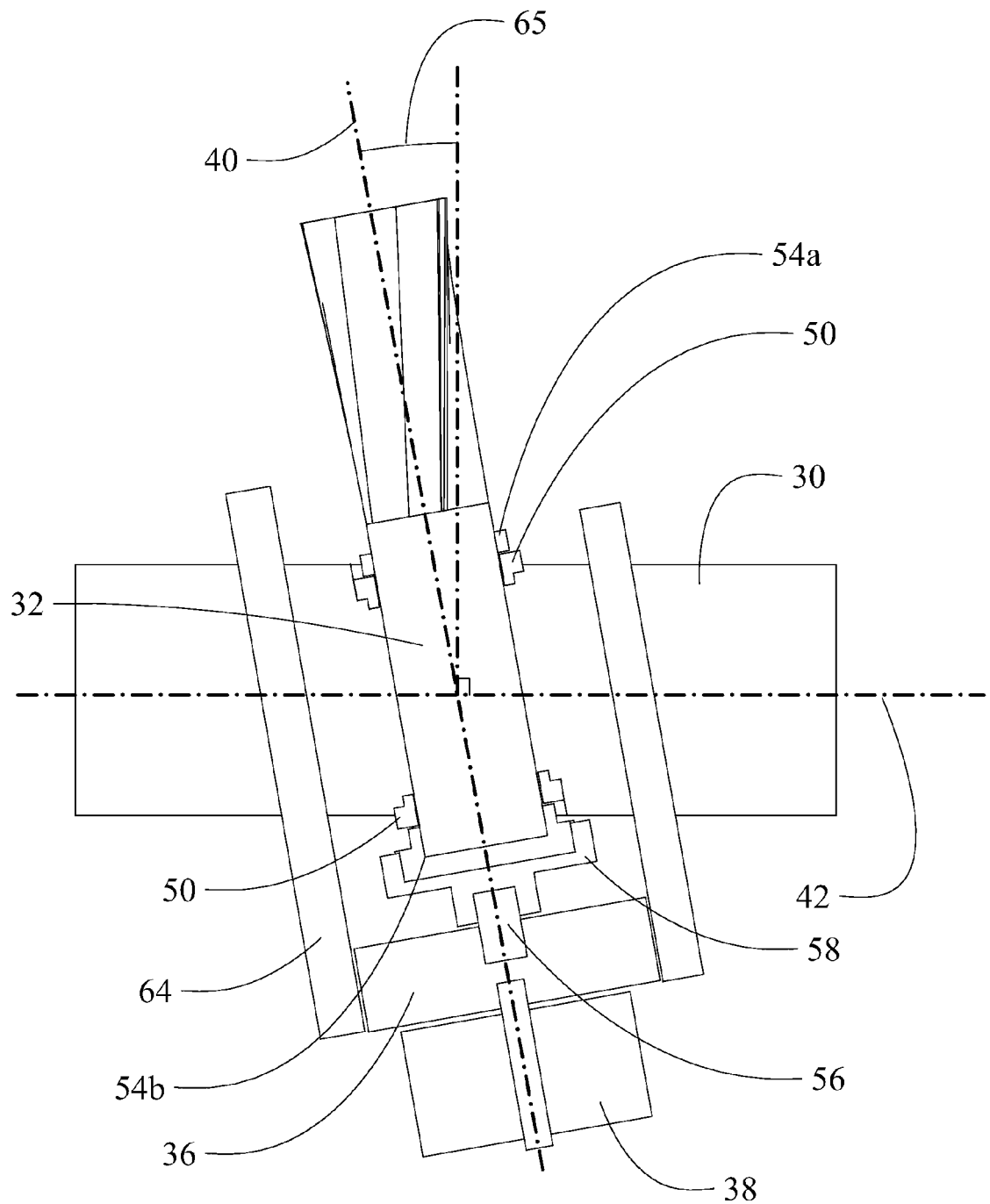
FIG. 3C is a side detailed view of an alternative configuration of the blade rake angle.

The net thrust of a single-blade propeller is offset from the propeller shaft. This creates a moment on the propeller shaft 30 and the supporting structure for the motor 26. It may be beneficial to rake the propeller axis 40 forward with respect to a plane perpendicular to the propeller shaft axis 42. In such a configuration the propeller blade sweeps a cone instead of a plane or disk. The angle at which the blade is raked forward may be called the "cone angle". Rotation of the propeller creates a centripetal force on the blade in an outward, radial direction. With the center of gravity of the propeller ahead of the propeller root, a moment is created that offsets the moment created by the offset thrust. The propeller rake may be adjusted to minimize the total moment at a particular flight condition by angularly mounting the pitch control unit and single propeller blade non-perpendicular with a rake angle 65 to the propeller shaft axis 42 as shown in FIG. 3C.

Figure 3D:
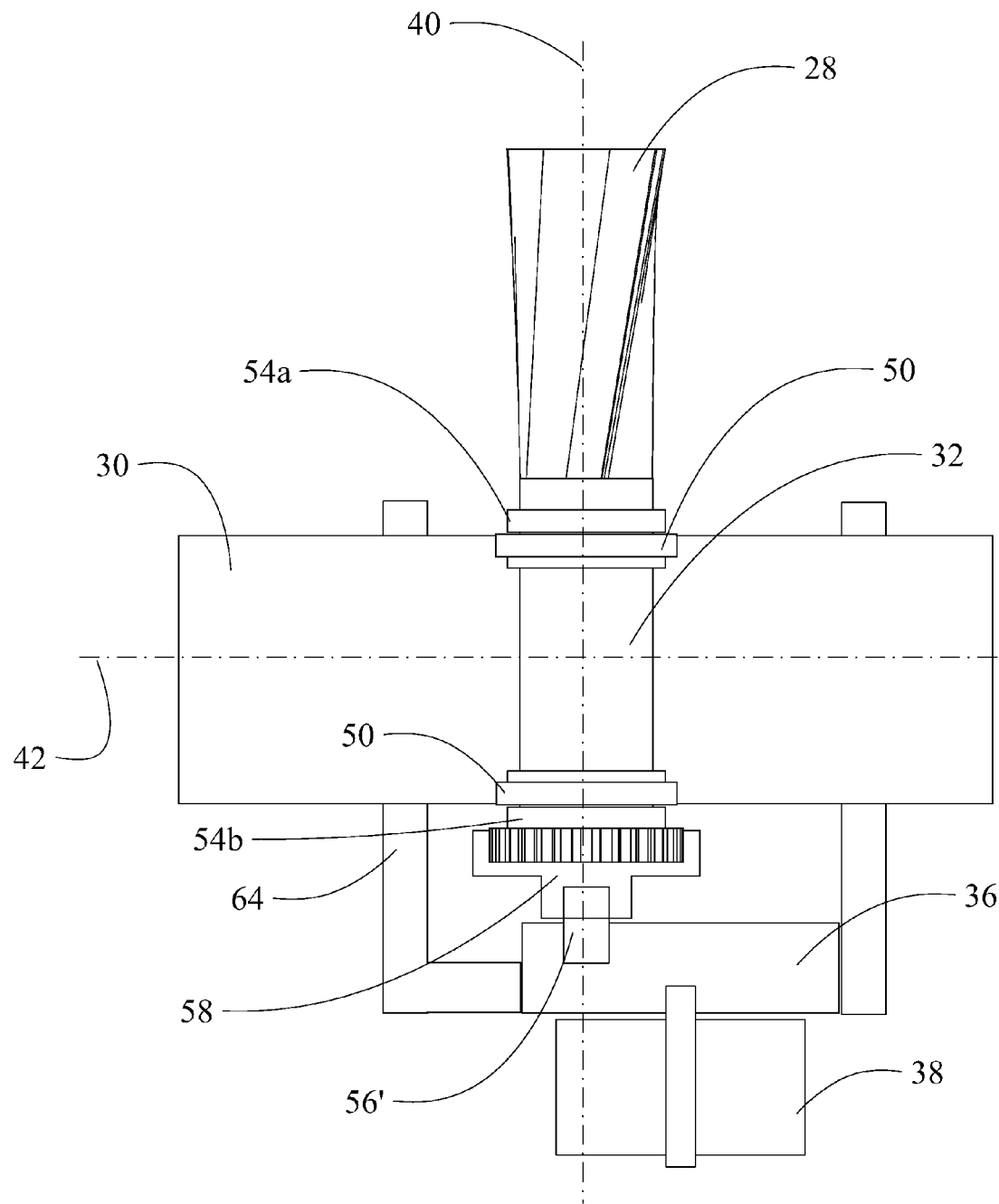
FIG. 3D is a side detailed view of an alternative configuration of the pitch control unit elements to counter offset thrust.

Instead of or in addition to raking the propeller forward, it may also be beneficial to rake or offset the center of gravity of the pitch control unit for purposes of countering offset thrust or offset torque. Offset thrust may be accommodated, in addition to or alternative to modifying the coning angle described above, by designing the gear set in the gearbox 36 to offset the rotary actuator output shaft 56' as shown in FIG. 3D to move the center of gravity of the gear box and motor aft.

Figure 3E:
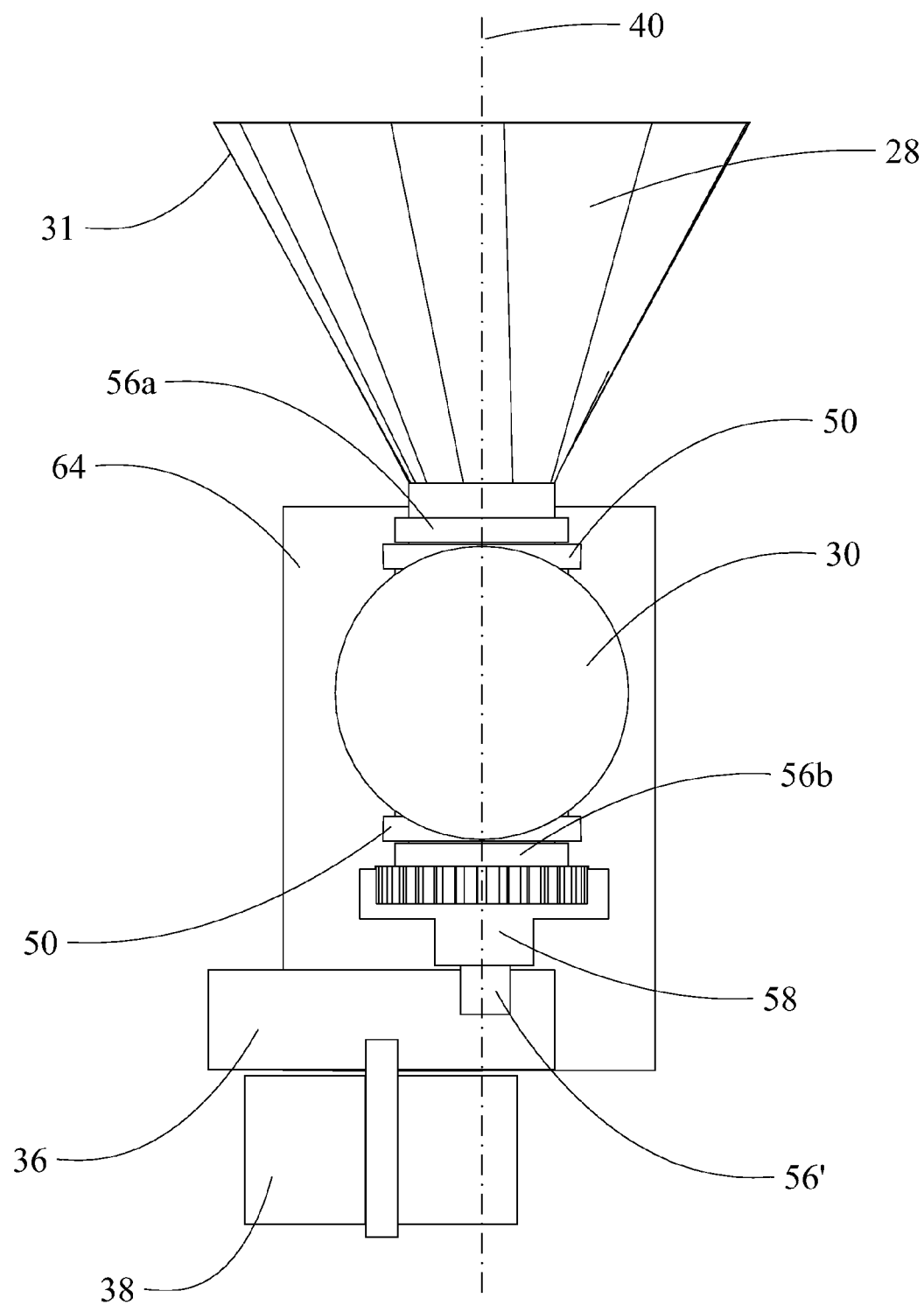
FIG. 3E is a front detailed view of an alternative configuration of the pitch control unit elements to counter offset torque

The net circumferential force of a single-blade propeller (due to its reaction of propeller shaft torque) is offset from the propeller shaft axis (offset torque). This creates an equal but opposite force on the propeller shaft that is perpendicular to both the propeller shaft axis and the propeller blade axis. It may be beneficial to offset this force at a particular flight condition by offsetting the mass of the pitch control unit in a direction perpendicular to a plane defined by the propeller blade axis and the propeller shaft axis in the direction of prop rotation. This offset moves the center of gravity of the entire propeller system to a point that is offset from the plane defined by the propeller axis and propeller shaft. This may be accomplished by designing the gear set in the gearbox 36 to offset the rotary actuator output shaft 56' as shown in FIG. 3E. This shifts the mass of both the gearbox 36 and pitch control motor 38 out of the propeller blade axis—propeller shaft axis plane in a direction toward the blade leading edge 31 as seen from the front. The resulting centripetal force may tend to offset the torque reaction force.

Figure 4:
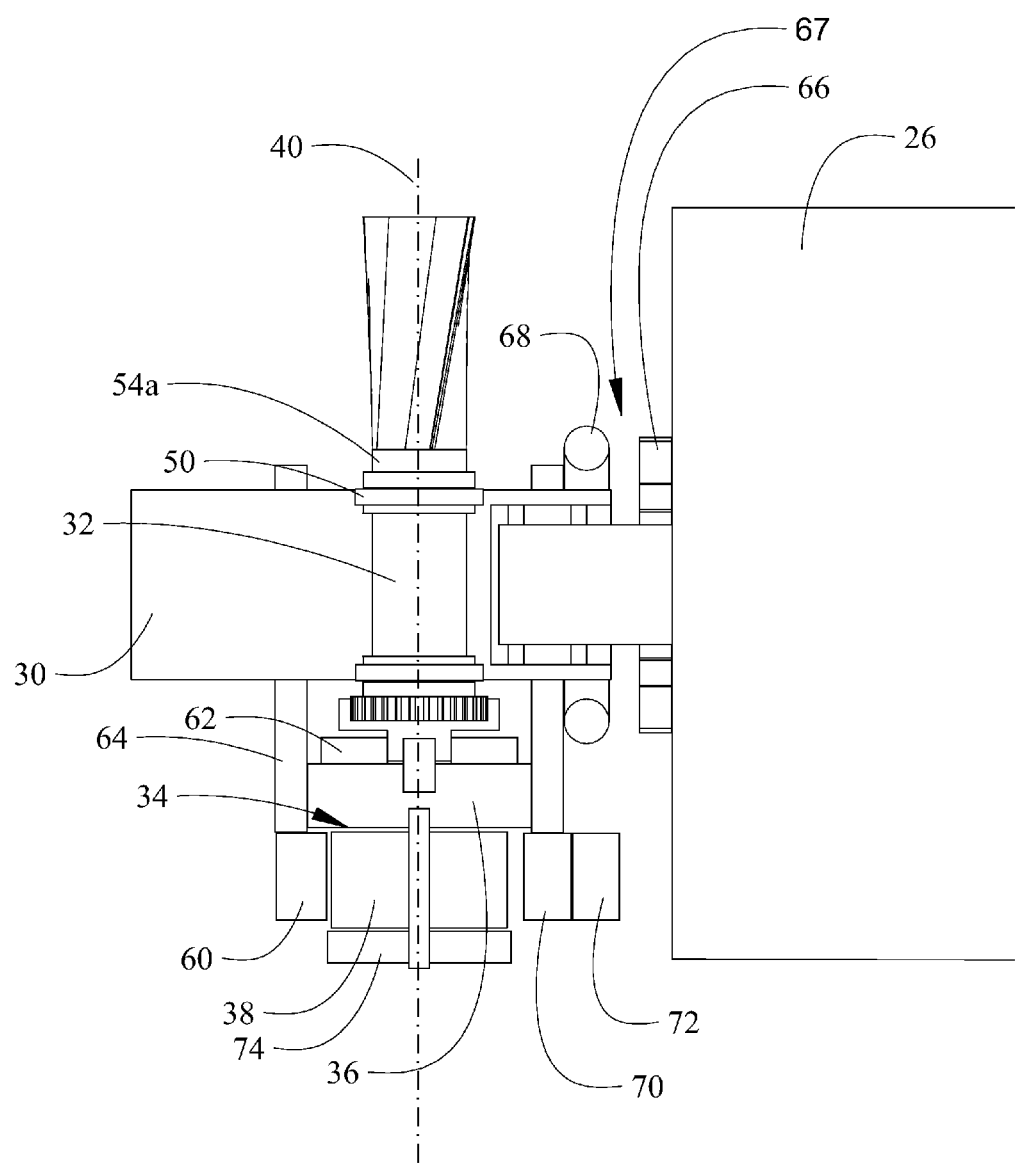
FIG. 4 is a side section view of a second embodiment of the pitch control unit.
Figure 5:
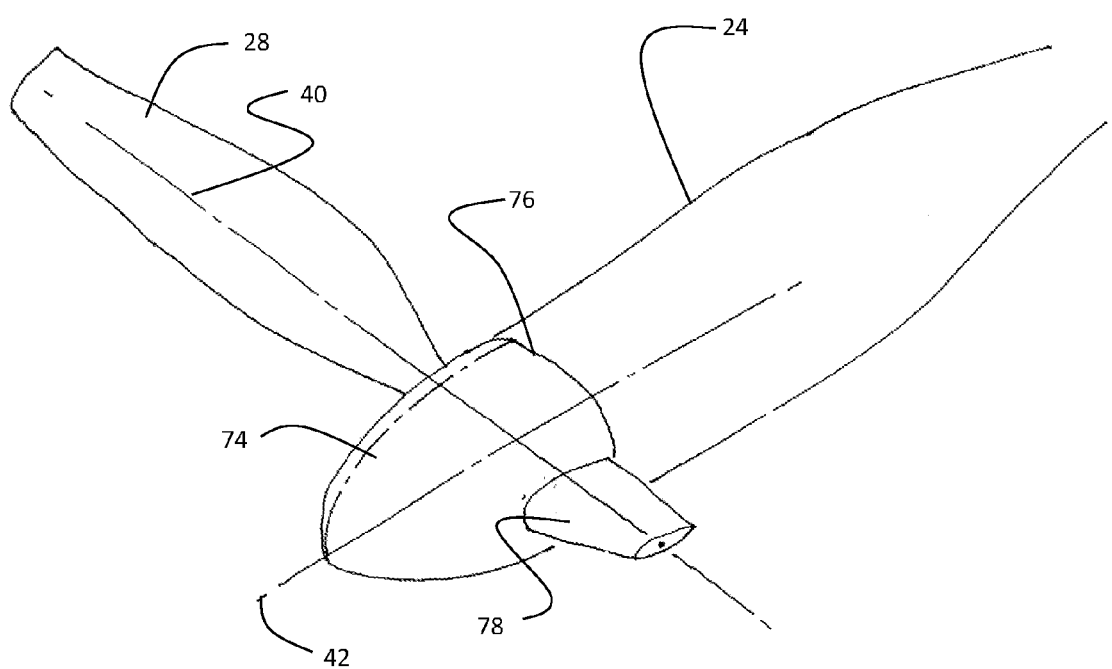
FIG. 5 is a perspective view of a spinner with stub fairing for use with the embodiments described.

Power produced by the airplane may be transmitted to the pitch control unit via wires and commutation (conductive rings and brushes) at the interface between the stationary and rotating components as previously described with respect to FIG. 2. Alternatively, power may be generated at an interface between the stationary (drive motor and nacelle) and rotating components (propeller drive shaft, propeller hub and pitch control unit, and a spinner as seen in FIGS. 2 and 5) with a generator 67 as shown in FIG. 4. A ring of one or more magnets 66 may be mounted to the stationary side of the interface. A series of one or more wire coils 68 can be arranged in a ring mounted to the propeller side. These coils can be connected to the controller 60. When the propeller shaft 30 spins, the coils move past the magnets and generate electricity which is rectified and otherwise processed by the controller 60 into a form usable by the pitch control motor 38 or an energy storage system. The controller 60 provides power to the pitch control motor 38 and can regulate power generation to maintain a favorable charge state in a battery 70, or alternatively a capacitor, which may store electrical energy. Stored electrical energy may provide extra power for actuation loads or signal receiver power.

The controller 60 receives control signals by hard wire via commutation (conductive rings and brushes) as previously described for connecting to the flight control computer or other control device in the airplane providing an encoded signal or other form of instructions for pitch control. Alternatively, electromagnetic transmission (e.g. radio) can be employed with a radio transmitter/receiver 72 as part of the pitch control unit to receive the pitch control instructions. While shown in the embodiment as a single combined unit, the radio transmitter may be part of the airplane system connected to the flight control computer or other control device and may transmit pitch position signals of the pitch control unit 34, for example the pitch angle output from the position sensor 62. The pitch control unit may thereby inform the airplane flight control computer of the propeller pitch position and other predetermined operational data.

As further shown in FIG. 4, the pitch control unit 34 may fix (lock) the blade pitch in the absence of electrical power or control signal. This capability gives "fail-safe" operation if failure occurs at an on-design operating point. Since 99% of flight time is spent on-design, likelihood of a failure occurring in the on-design condition is good. Blade pitch locking may be achieved using an irreversible gearbox, for example, a worm gear system which cannot be back-driven. Alternatively, an active or passive brake 74 may be employed. The brake may incorporate a mechanism that engages one or more gear teeth or a mechanism that creates friction when the motor is not running.

The pitch control unit 34 may additionally provide a means for fine-tuning propeller balance. An additional component (such as a ballast weight) may be adjusted in radial position to fine-tune propeller balance. Alternatively, location of one or more components of the actuator system may be adjustable within the support frame 64 along the propeller's radial axis to fine-tune propeller balance.

As shown in FIG. 5, a propeller spinner 74 is provided as an aerodynamic fairing that encloses the propeller hub including the hub tube 32, bearings 50 and lock rings 54a, 54b and some portion of the propeller pitch control unit 34 seen in FIGS. 3A-3C and 4. An aft edge 76 of the spinner 74 is coordinated with the fairing or nacelle 24 that encloses the motor 26 and motor support as shown in and described with respect to FIG. 2. There may be some provision for cooling air entry into the nacelle to cool the motor. The spinner 74 is generally axially symmetric and has an opening for the propeller that permits the propeller to change pitch without conflicting with the spinner. It may also have a streamlined stub fairing 78 that encloses the portion of the pitch control unit 34 that extends beyond the axially symmetric surface of the spinner. Lighter pitch control unit elements can balance the propeller blade if the pitch control unit projects farther from the propeller shaft axis 42 with only a small aerodynamic penalty of the fairing. The stub fairing 78 may be aligned with the local flow in the design condition. The stub fairing 78 may have an incidence angle that aligns with the approximately helical flow produced by the propeller blade 28.

Figure 6:
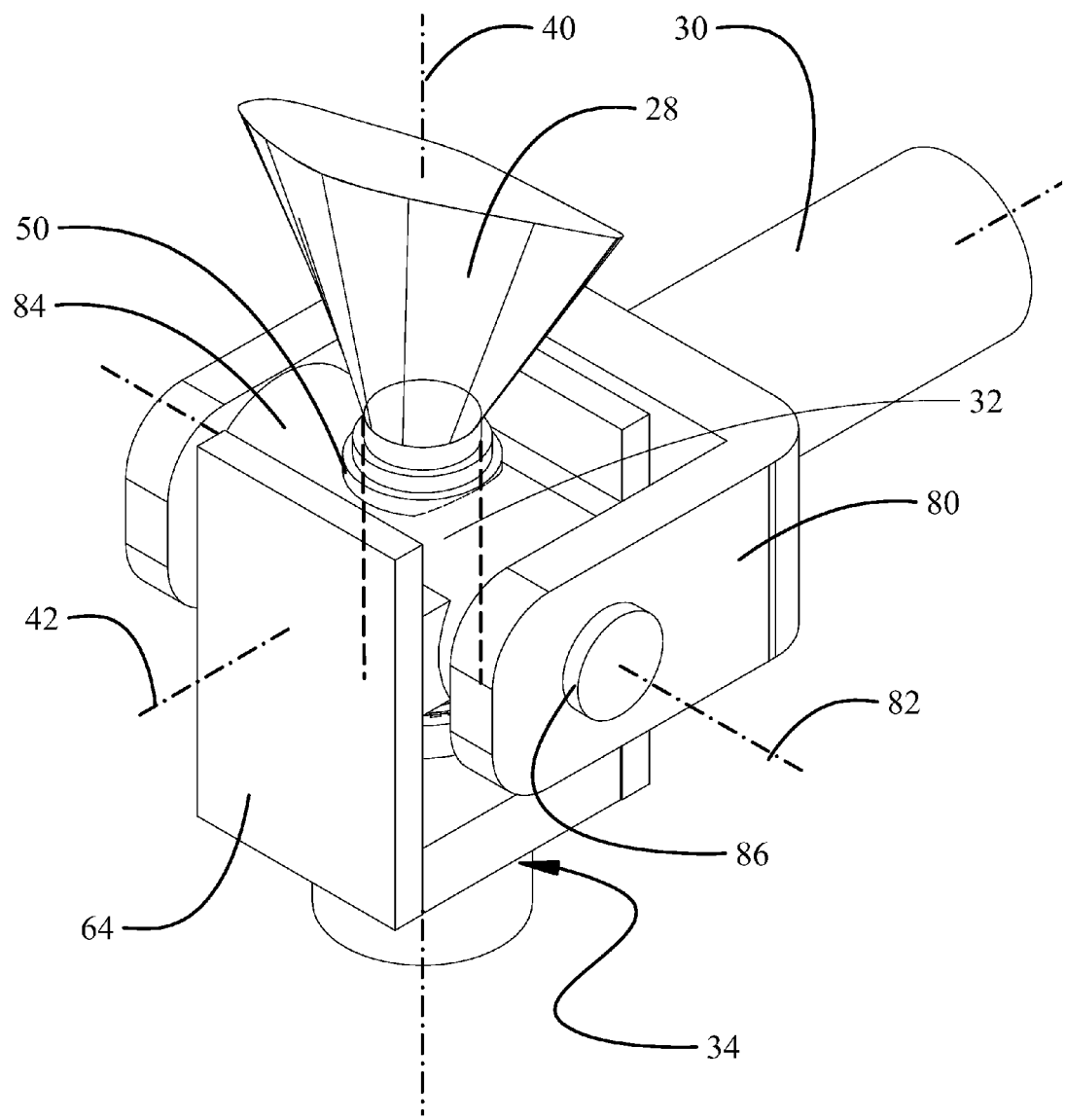
FIG. 6 is a perspective view of a blade teetering structure.

A blade teeter mechanism, shown in FIG. 6, may be employed to enable the propeller blade 28 to swing approximately forward and aft, approximately in the plane defined by the propeller blade axis 40 and the propeller shaft axis 42. The embodiment shown is but one example. A yoke 80 interconnects the propeller shaft 30 with the pitch actuation unit support frame 64 and the blade 28 and pitch control unit 34 are free to swing fore and aft about a teeter axis 82 which is substantially perpendicular to the propeller shaft axis 42. The blade 28, as before, is able to rotate about blade axis 40 within bearings 50 now supported in a cross-member 84 that spans the yoke 80 for change of pitch. Bearings 86 in the yoke permit rotation of the cross-member 84, the propeller blade 28 and pitch control unit 34.

Two benefits accrue from a teetering blade. First, the moment on the propeller shaft 30 resulting from the offset of the single propeller blade 28 net thrust is eliminated. Second, the propeller blade has a natural tendency to temper fluctuations in blade angle of attack resulting from non-uniform inflow. This can reduce induced losses and blade parasitic losses. In certain embodiments, it may be beneficial to angle the teeter axis 82 with respect to the propeller shaft axis 30 so that a forward motion of the propeller blade results in a reduced blade angle of attack. This will increase the natural tendency of the propeller blade to temper fluctuations in blade angle of attack resulting from non-uniform inflow.

Figure 7:
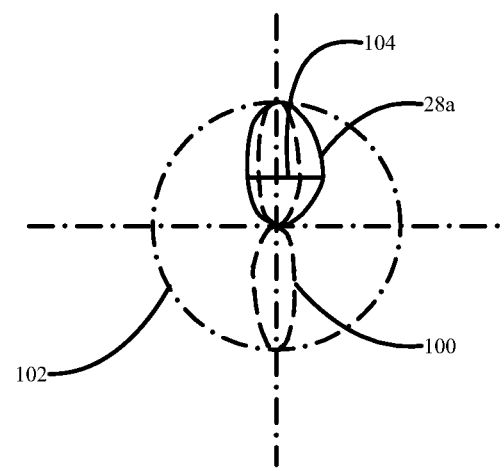
FIG. 7 is an overlay of a first single blade propeller blade arrangement with double the chord compared to a baseline two blade propeller.

To improve the efficiency of the propulsion system but maintain the same airplane performance, a single blade propeller must produce the same thrust as an equivalent multi-blade prop. For the purpose of examples herein, a baseline propeller 100 of two blades having a defined chord and radius is compared to the single blade propeller 28 of the embodiments described. If the blades operate at the same lift coefficient the single blade can have the same radius to provide an equal diameter of revolution 102 but a chord 104 approximately twice as wide as the baseline propeller 100 to achieve the necessary thrust performance. This propeller will have reduced parasitic losses due to the increased Reynolds number of the blade sections and will have approximately the same induced losses because its diameter and thrust are unchanged. There may be a minor increase in induced losses due to greater irregularity of the disk loading from the single blade. The single bladed propeller 28a in this configuration is illustrated in FIG. 7 compared to the baseline two bladed propeller 100.

Figure 8:
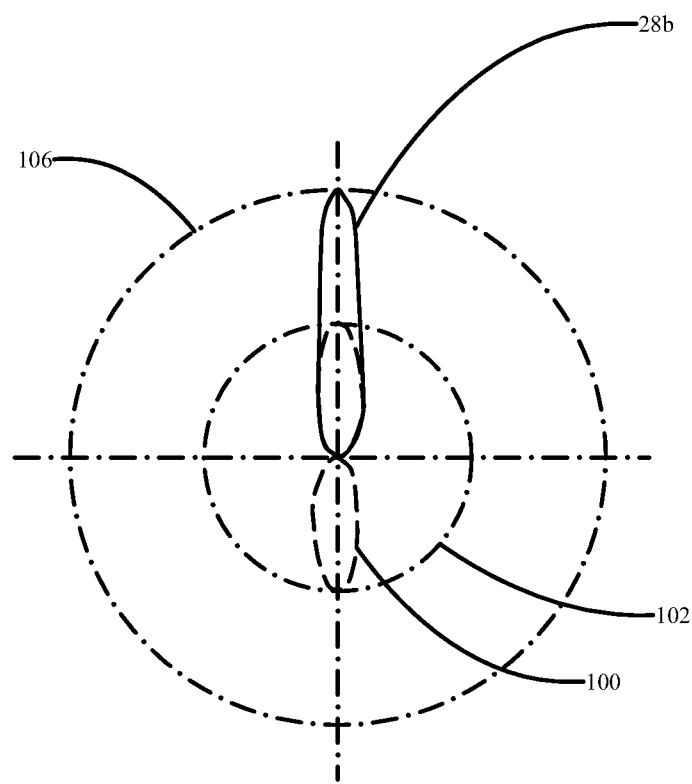
FIG. 8 is an overlay of a second single blade propeller blade arrangement with double the radius compared to a baseline two blade propeller.

Alternatively, the single blade can have approximately the same chord as the blades of the baseline two bladed propeller but approximately twice the radius providing a diameter of revolution 106 twice the size of the baseline propeller. This propeller will operate at about half the RPM of the two-blade propeller and will the same blade efficiency (blade section L/D) but have reduced induced losses. The single bladed propeller 28b in this configuration is illustrated in FIG. 8 compared to the baseline two bladed propeller 100.

Figure 9:
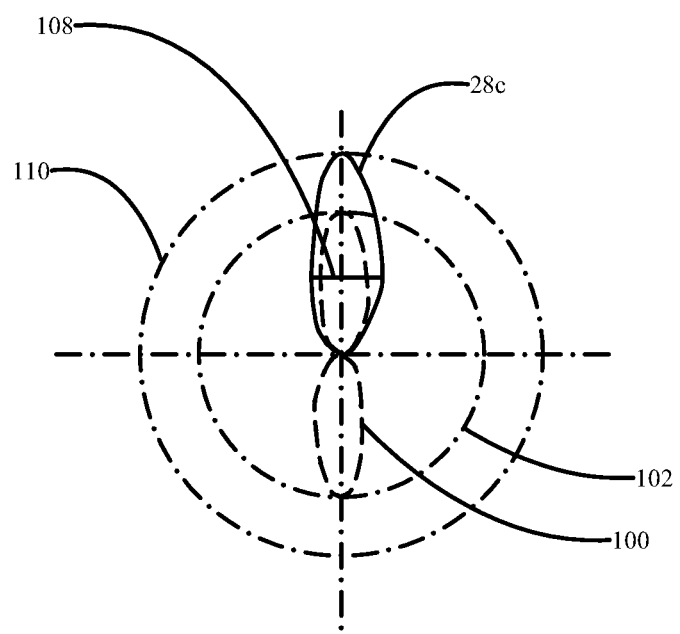
FIG. 9 is an overlay of a third single blade propeller blade arrangement with proportionally increased radius and chord compared to a baseline two blade propeller; and, FIGS. 10A and 10B are a flow chart of a method for implementation of the embodiment described herein.

As a second alternative, a single propeller blade 28c can have some combination of radius and chord that provides approximately the same total blade area as the equivalent two-blade prop. As an example the radius is about midway between the two cases above (i.e. 1.41 times the radius of the two-blade propeller) providing a diameter of revolution 110 and the span to chord proportion of the blade are similar increased by a factor of 1.41 as exemplified by chord 108. This propeller will operate at about ⅔ the RPM of the baseline two-blade propeller and, relative to the two-blade propeller, this single propeller blade may have reduced induced losses and improved blade section L/D. The single bladed propeller 28c in this configuration is illustrated in FIG. 9 compared to the baseline two bladed propeller 100.

Figure 10A:
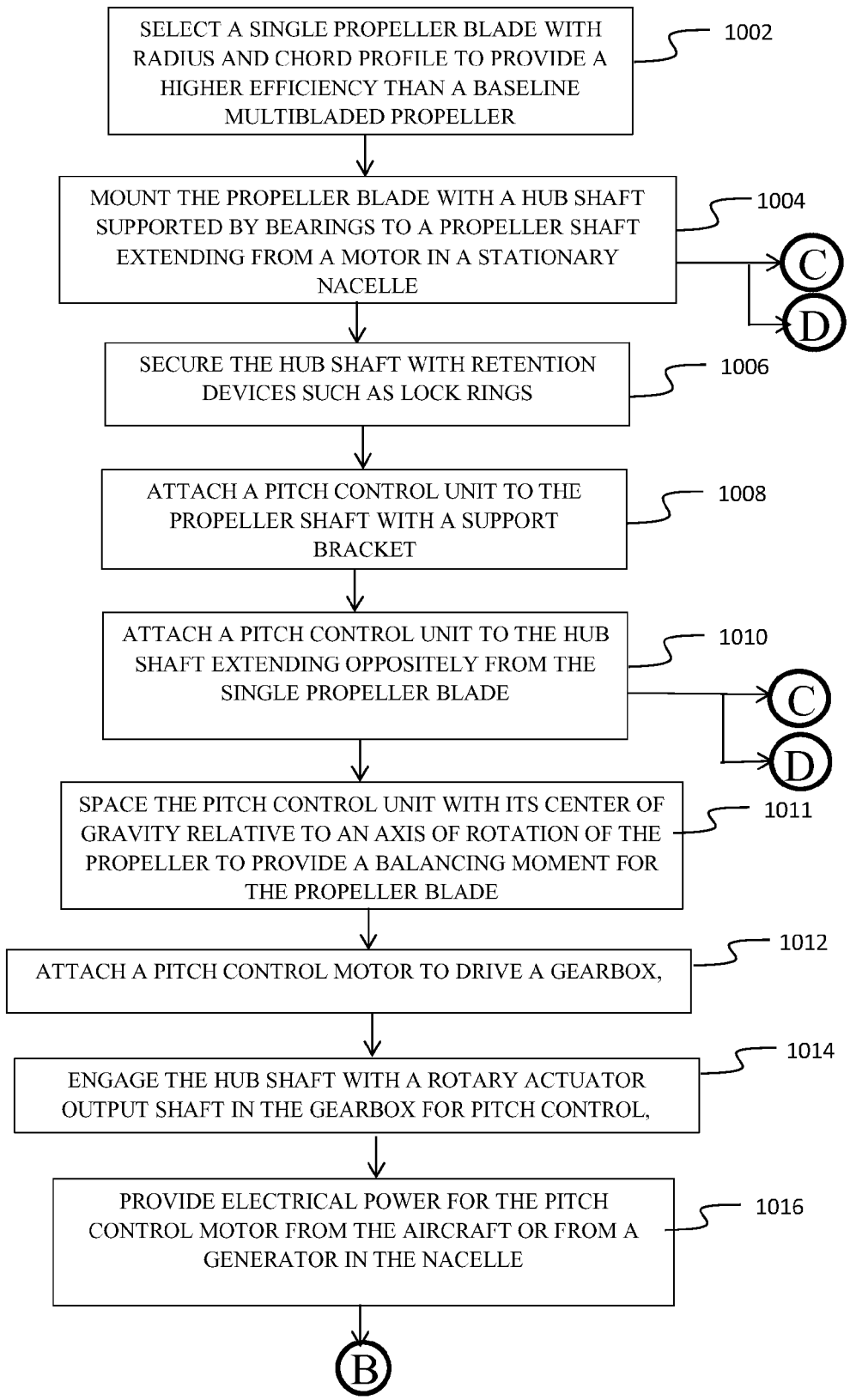
Figure 10B:
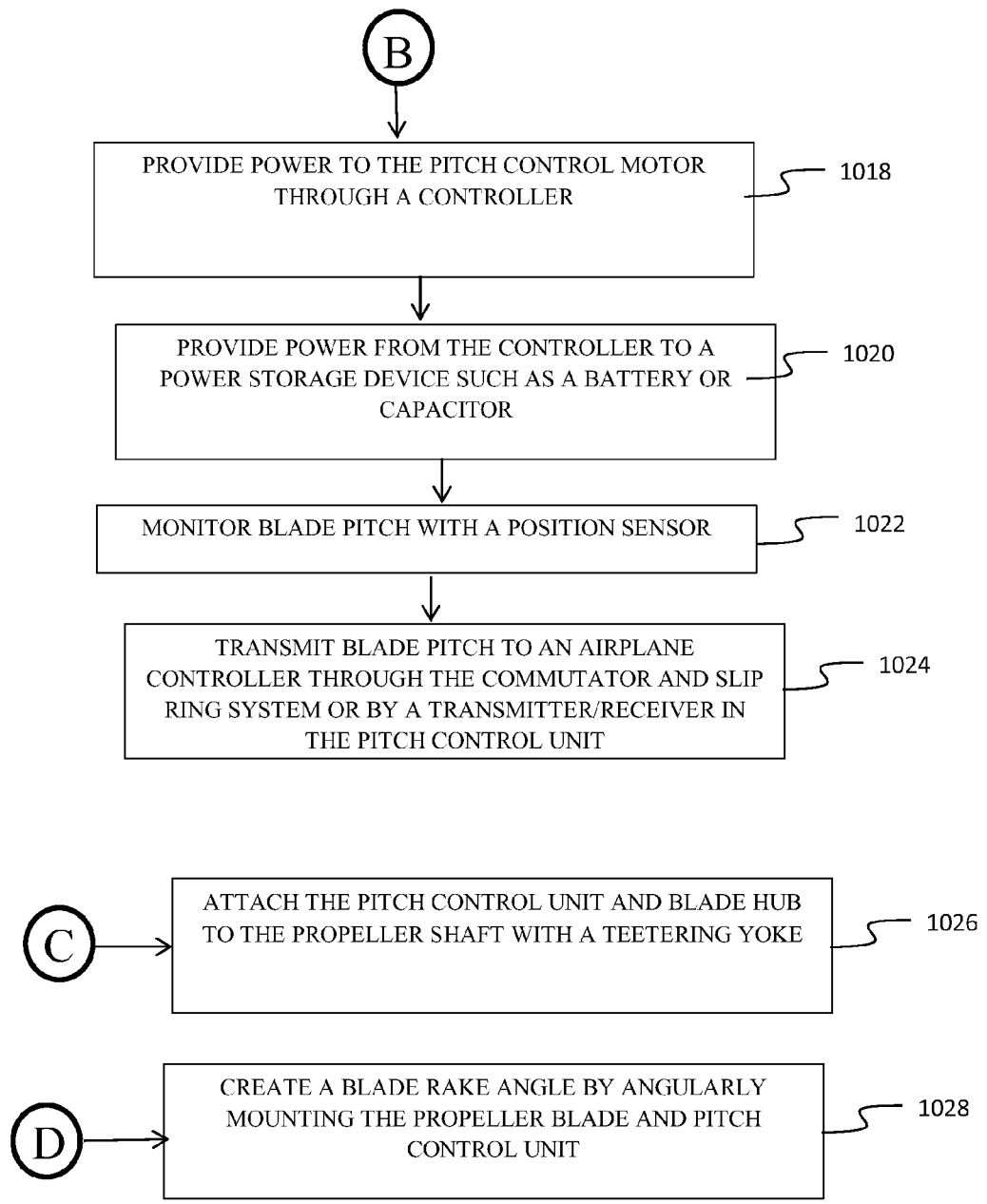

A method for counter balancing a single blade propeller for higher efficiency in thrust production over conventional multibladed propellers is shown in FIGS. 10A and 10B. A single propeller blade is selected with radius and chord profile to provide a higher efficiency than a baseline multi-bladed propeller, step 1002. The propeller blade is mounted with a hub shaft supported by bearings to a propeller shaft extending from a motor, step 1004 in a stationary nacelle. The hub shaft is secured with retention devices such as lock rings, step 1006. A pitch control unit is attached to the propeller shaft with a support bracket, step 1008, and to the hub shaft extending oppositely from the single propeller blade, step 1010. The pitch control unit is spaced with its center of gravity relative to an axis of rotation of the propeller to provide a balancing force for the propeller blade, step 1011. A pitch control motor is attached to drive a gearbox, step 1012 having a rotary actuator output shaft engaging the hub shaft for pitch control, step 1014. Electrical power is provided for the pitch control motor by connecting an airplane power source through a commutator and slip ring arrangement from the stationary side of the nacelle to the rotating side of the propeller hub or by a generator having one or more magnets on the stationary side and one or more coils on the rotating side, step 1016. A controller provides power to the pitch control motor, step 1018 and to a chargeable energy storage element such as a battery or capacitor, step 1020. Blade pitch is monitored with a position sensor, step 1022, and transmitted to an airplane controller through the commutator and slip ring system or by a transmitter/receiver in the pitch control unit, step 1024. A teetering yoke may be employed to attach the pitch control unit and blade hub to the propeller shaft, step 1026, to allow the single propeller blade to teeter. Alternatively a blade rake angle may be created by angularly mounting the propeller blade and pitch control unit, step 1028.

Having now described various embodiments in detail as required by the patent statutes, those skilled in the art will recognize modifications and substitutions to the specific embodiments disclosed herein. Such modifications are within the scope and intent of the present disclosure as defined in the following claims.

What is claimed is:

1. An improved performance propeller comprising:
   a single propeller blade having an axis of rotation and a centripetal force about said axis;
   at least one retention device radially restraining the single propeller blade;
   a pitch control unit having a gear box and pitch motor operably connected to the gearbox mounted opposite the single propeller blade, the pitch control unit positioned to provide a balancing force for the propeller about said axis and, said gear box and pitch motor controlably rotating the single propeller blade about the axis of rotation to a target pitch responsive to a control signal.

2. The improved performance propeller as defined in claim 1 wherein the gear box is connected to a hub tube of the single propeller blade, said gear box rotating said hub tube about the blade axis.

3. The improved performance propeller as defined in claim 2 further comprising: at least one bearing engaging the hub tube to support rotation of the hub tube.

4. The improved performance propeller as defined in claim 3 wherein the hub tube extends substantially perpendicularly through a propeller shaft and further comprising a drive motor connected to rotationally power said propeller shaft and,
said at least one bearing comprises a pair of bearings diametrically opposed across the axis of rotation supporting said hub tube in said propeller shaft; and,
said at least one retention device comprises a first lock ring engaging the hub tube adjacent a first one of the pair of bearings and a second lock ring engaging the hub tube adjacent a second one of the pair of bearings.

5. The improved performance propeller as defined in claim 4 further comprising a coupler adapted to engage one of said lock rings to a rotary actuator shaft extending from the gear box.

6. The improved performance propeller as defined in claim 2 wherein the blade axis has a rake angle with respect to the rotational axis.

7. An improved performance propeller comprising:
a single propeller blade having an axis of rotation and a centripetal force about said axis;
a pitch control unit mounted opposite the single propeller blade and having compensating centripetal force with respect to the single propeller blade about said axis, said pitch control unit having a gear box connected to a hub tube of the single propeller blade, said gear box rotating said hub tube about a blade axis to define pitch of the single propeller blade; and, a pitch motor responsive to a control signal operably connected to the gear box wherein at least one of said gear box and pitch motor are offset from the axis.

8. The improved performance propeller as defined in claim 3 wherein the hub tube extends through a cross-member supported by a yoke, said cross member rotatable within the yoke allowing said single propeller blade and pitch control unit to teeter about a teeter axis.

9. The improved performance propeller as defined in claim 8 wherein the teeter axis is angled with respect to the rotational axis.

10. The improved performance propeller as defined in claim 2 further comprising a controller operably connected to the pitch motor and an electrical power source and receiving instructions for blade pitch, said controller providing electrical power to said pitch motor responsive to said instructions.

11. The improved performance propeller as defined in claim 10 wherein the power source is an airplane power source and commutating slip rings and brushes connect the power source to the controller.

12. The improved performance propeller as defined in claim 10 wherein the power source is a generator, said generator having at least one magnet mounted on a stationary side of an interface between stationary and rotating components and at least one coil mounted adjacent to and rotating with the pitch control unit, said coils connected to the controller to provide electrical power.

13. The improved performance propeller as defined in claim 12 further comprising a battery connected to the coils through the controller, said controller distributing power to the battery.

14. The improved performance propeller as defined in claim 10 further comprising a receiver connected to the controller to receive said instructions.

15. The improved performance propeller as defined in claim 14 further comprising a position sensor in the pitch control unit, said position sensor providing a pitch angle output to the controller.

16. The improved performance propeller as defined in claim 15 further comprising a transmitter connected to the controller and transmitting said pitch angle output.

17. The improved performance propeller as defined in claim 2 further comprising a brake connected to a selected one of the pitch motor and gearbox.

18. A method for counter balancing a single blade propeller for higher efficiency in thrust production over conventional multibladed propellers, said method comprising:
selecting a single propeller blade with radius and chord profile combination providing the same total blade area as a two-blade propeller having a desired thrust;
mounting the propeller blade with a hub shaft supported by bearings to a propeller shaft extending from a motor;
securing the hub shaft with retention devices;
attaching a pitch control unit to the propeller shaft with a support bracket and to the hub shaft extending oppositely from the single propeller blade, said pitch control unit having a pitch control motor to drive a gearbox having a rotary actuator output shaft engaging the hub shaft for pitch control responsive to a control signal; and,
spacing a center of gravity of the pitch control unit relative to an axis of rotation of the propeller to provide a balancing force for the propeller blade.

19. The method as defined in claim 18 further comprising: attaching a pitch control motor to drive a gearbox having a rotary actuator output shaft engaging the hub shaft for pitch control.

20. The method as defined in claim 19 further comprising: providing electrical power for the pitch control motor by connecting an airplane power source through a commutator and slip ring arrangement from a stationary side of a nacelle to a rotating side of a propeller hub.

21. The method as defined in claim 20 further comprising: providing electrical power for the pitch control motor by a generator having at least one magnet on a stationary side and at least one coil on a rotating side.

22. The method as defined in claim 19 further comprising: providing power with a controller to the pitch control motor and to a chargeable energy storage element.

23. The method as defined in claim 22 further comprising: monitoring blade pitch with a position sensor; and transmitting said blade pitch to an airplane controller.

24. The method as defined in claim 18 further comprising: employing a teetering yoke to attach the pitch control unit and hub shaft to the propeller shaft.

25. The method as defined in claim 18 further comprising: angularly mounting the propeller blade and pitch control unit to create a blade rake angle.

* * * * *